United States Patent [19]

Matsumoto

[11] 4,429,321

[45] Jan. 31, 1984

[54] LIQUID JET RECORDING DEVICE

[75] Inventor: Shigeyuki Matsumoto, Kawasaki, Japan

[73] Assignee: Canon Kabushiki Kaisha, Tokyo, Japan

[21] Appl. No.: 311,894

[22] Filed: Oct. 15, 1981

[30] Foreign Application Priority Data

Oct. 23, 1980 [JP] Japan ................................ 55-149076
Oct. 23, 1980 [JP] Japan ................................ 55-149077

[51] Int. Cl.³ ............................................ G01D 15/16
[52] U.S. Cl. ................................................ 346/140 R
[58] Field of Search .......................... 346/75, 1.1, 140; 239/102

[56] References Cited

U.S. PATENT DOCUMENTS 4,271,416 6/1981 Shimizu et al. .............. 346/140 PD
4,296,421 10/1981 Hara et al. ........................ 346/75 X

FOREIGN PATENT DOCUMENTS 55-73567 6/1980 Japan .................................... 346/75
55-87571 6/1980 Japan ........................... 346/140 PD

*Primary Examiner*—Donald A. Griffin
*Attorney, Agent, or Firm*—Fitzpatrick, Cella, Harper & Scinto

[57] ABSTRACT

A liquid jet recording device comprises a plurality of heat actuating chamber portions communicating with ejecting orifices for ejecting a liquid to form flying droplets, an electrothermal transducer provided for each heat actuating chamber portion so as to transfer heat effectively to the liquid filling the heat actuating chamber portion, and a driving circuit portion comprising a plurality of function elements for separating signals to drive independently each of the electrothermal transducers and for driving the electrothermal transducers. The plurality of electrothermal transducers and the plurality of function elements are structurally formed in the surface of a substrate, or the plurality of electrothermal transducers are mounted on the surface of a substrate in the surface of which the function elements are formed, and the electrothermal transducers are mounted in a form of a laminating structure.

12 Claims, 13 Drawing Figures

LIQUID JET RECORDING DEVICE

BACKGROUND OF THE INVENTION

1. Field of the Invention

This invention relates to a liquid jet recording device for recording by forming flying liquid droplets, and more particularly, to a liquid jet recording device for recording which propels droplets by applying heat energy to a liquid.

2. Description of the Prior Art

Liquid jet recording devices have been recently developed and improved since liquid jet recording devices can effect non-impact recording, are suitable for modern business offices or other business treating departments where silence is required, can effect a high speed recording with a high density of projected dots, and further, can render the maintenance easier or can be maintenancefree.

Among the liquid jet recording devices, the device disclosed in Deutsch Offenlegungsschrift Nr. No. 2843064 can operate to produce high speed recording with a high density due to its particular structure, and further, the so-called "full line recording head" can easily be designed and fabricated.

However, even such a liquid jet recording device still has a great deal of room for improvement before realizing full line recording with high density in various points. That is, there are various problems concerning designing the recording head structure, fabrication of such a recording head to have recording accuracy, reliability of recording, and durability of the head. The productivity and especially mass productivity also need improvement.

That is, for the purpose of effecting high density, high speed copying by the above mentioned liquid jet recording device, it is required that the recording head portion has a highly integrated structure. The integration suffers from various problems as to the structural configuration of elements constituting a recording head and a signal treating means, yield in the fabrication, electrical wiring of the elements and the means, design thereof, for productivity and mass productivity.

For example, the features of the liquid jet recording devices can be utilized to the utmost if, as a means for generating heat to actuate a liquid so as to propel liquid droplets, many electrothermal transducers are arranged to correspond to the density of recording picture elements, and also the driving signal separating element array (e.g. transistor array and diode array accompanied with a signal amplifying means) for driving the many electrothermal transducers independently when necessary can be integrated and produced efficiently.

However, at present each element array is independently produced in a form of chip for the purpose of increasing the yield and making the fabrication easier, and each chip is mounted on a common substrate and the corresponding elements are electrically connected to each other by wiring. Lead electrodes are provided for electrically connecting to other electrical means by bonding or other means. Then, ejecting orifices for propelling liquid droplets and head constituting members for forming a space to be filled with a liquid, such as a heat actuating chamber portion communicating with the orifice and the like, are adhered to produce a recording head. Therefore, such fabrication is troublesome and the mass production efficiency is very low.

In addition, when a highly integrated recording head of high density and long head length is desired, the above mentioned problems should be solved to a great extent.

Furthermore, the above mentioned drawbacks should be eliminated so as to obtain a high reliability of production and a high reproducibility of the desired characteristics as designed.

SUMMARY OF THE INVENTION

An object of the present invention is to provide a liquid jet recording device free from the above mentioned drawbacks.

Another object of the present invention is to provide a liquid jet recording device which is of good reliability of fabrication, highly stable productivity, high reproducibility characteristics and stable, high speed recording with high density.

According to the present invention, there is provided a liquid jet recording device which comprises a plurality of heat actuating chamber portions communicating with ejecting orifices for ejecting a liquid to form flying droplets, an electrothermal transducer provided for each heat actuating chamber portion so as to transfer heat effectively to the liquid filling the heat actuating chamber portion, and a driving circuit portion comprising a plurality of function elements for separating signals to drive independently each of the electrothermal transducers and for driving the electrothermal transducers, and with the plurality of electrothermal transducers and the plurality of function elements being structurally formed in the surface of a substrate.

According to another aspect of the present invention, there is provided a liquid jet recording device which comprises a plurality of heat actuating chamber portions communicating with ejecting orifices for ejecting a liquid to form flying droplets, an electrothermal transducer provided for each heat actuating chamber portion so as to transfer heat effectively to the liquid filling the heat actuating chamber portion, and a driving circuit portion comprising a plurality of function elements for separating signals to drive independently each of the electrothermal transducers and driving the electrothermal transducers, and for the plurality of electrothermal transducers being mounted on the surface of a substrate in the surface of which the function elements are formed.

BRIEF DESCRIPTION OF THE DRAWINGS

FIG. 1(*b*) shows schematically a cross sectional view of the device in FIG. 1(*a*) taken along the flow path;

FIG. 8(*b*) shows schematically a cross sectional view of the device illustrated in FIG. 8(*a*);

DESCRIPTION OF THE PREFERRED EMBODIMENTS

The present invention is explained in detail in the following by referring to the attached drawings.

Figure 1A:
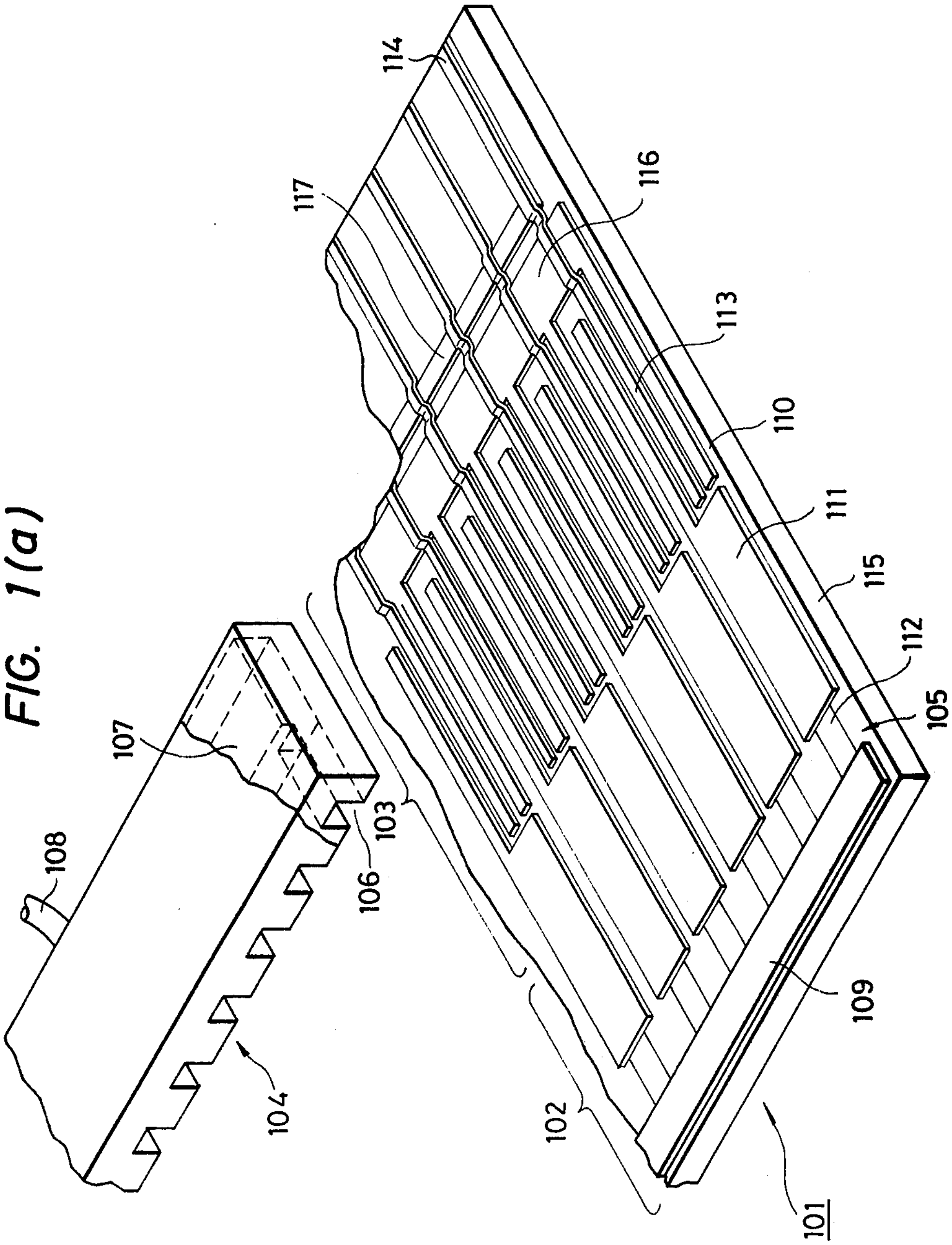
FIG. 1(*a*) shows schematically an oblique view of an embodiment of the liquid jet recording device of the present invention.

FIG. 1(*a*) and FIG. 1(*b*) show one of the preferred liquid jet recording devices of the present invention.

Now referring to FIG. 1, the liquid jet recording device basically comprises an electrothermal transducer array portion 102 where a plurality of electrothermal transducers are arranged in a form of array, a driving circuit portion 103 which is composed of function elements corresponding to the electrothermal elements, an element bearing member 101, and a grooved lid member 104 having a predetermined number of grooves having a predetermined shape and dimension for forming a common liquid chamber for feeding the liquid and flow paths.

Grooved lid member 104 is provided with grooves 106 which are arranged such that the arranging pitch of the grooves are the same as that of the electrothermal transducers 105. Therefore, the grooves 106 of the grooved lid member 104 can correspondingly cover the electrothermal transducers 105 which are disposed regularly at a predetermined intervals with predetermined dimensions.

Each groove 106 is in communication with a groove 107 of a common liquid chamber provided at the rear portion of grooved lid member 104. The groove 107 is arranged in the direction at right angle with the axis of groove 106.

Grooved lid member 104 is bonded to element bearing member 101 such that the grooves 106 face to the corresponding electrothermal transducers 105 at the electrothermal transducer array portion 102. As a result, there are formed a plurality of liquid paths each of which has a heat actuating chamber portion and a common liquid chamber for supplying a liquid to each liquid path.

A liquid feeding pipe 108 for supplying a liquid to common liquid chamber 107 from a liquid reservoir (not shown) is provided at a rear portion of the groove 106.

Electrothermal transducer 105 is provided with a resistive heater portion 112. The resistive heater portion 112 serves to apply the generated heat to the liquid, and said resistive heater portion 112 is located between a common electrode 109 and an electrode 111 connected to the collector of a transistor 110 which is a function element constituting a driving circuit portion 103.

On the whole surface of electrothermal transducer array portion 102, there is provided an electrically insulating protective layer (not shown) so as to prevent short circuit between common electrode 109 and collector electrode 111 and also to prevent contact between the liquid and the resistive heater portion 112.

Driving circuit portion 103 has a collector region, a base region and an emitter region under collector electrode 111, base electrode 113 and emitter electrode 114, respectively. These regions are formed under the surface of a semiconductor substrate 115. Each base electrode 113 is formed such that each base electrode 113 is connected to a base common electrode 116 disposed at the rear portion. Electrode 117 serves to apply a high voltage to the collector region so as to isolate electrically the transistors 110 from one another, and the electrode 117 is common to all the transistors.

Referring to FIG. 1(*b*), an element bearing member 101 has, under the surface, a structure comprising various function elements. The element bearing member 101 comprises a semiconductive substrate 118 and an epitaxial layer 119. The epitaxial layer 119 contains structurally electrothermal transducers 105 and transistors 110 as function elements.

The electrothermal transducer 105 is composed of resistive heater portion 112, common electrode 109, and electrode 111 connected to the collector region of transistor 110 which are provided at the surface portion of the epitaxial layer 119. The resistive heater portion 112 is composed of a resistive heater 120 and a protective layer 121 for protecting the resistive heater 120.

A heat actuating chamber portion 122 is provided on the resistive heater portion 112. In the portion 122, there is caused an abrupt state change including formation of a bubble and volume shrinkage of said bubble by the heat generated at the resistive heater portion 112. Heat actuating chamber portion 122 is in communication with an ejection orifice 123 through which a liquid droplet is ejected by the action of the state change as mentioned above, and also in communication with a common liquid chamber 124 provided at the rear portion. A liquid feeding pipe 108 is attached to the common liquid chamber 124 to supply the liquid from a reservoir provided outside.

Behind each electrothermal transducer 105, a transistor 110 is provided structurally in the epitaxial layer 119. The transistor 110 has an ordinary transistor structure, and at the bottom portion there is provided an embedded member 128-1 for the purpose of decreasing the resistance at collector region 125. An ohmic region 128-2 is provided between electrode 111 and collector region 125 so as to form an ohmic contact therebetween.

Electrodes 111 and 117 are derived from collector region 125, and electrodes 113 and 114 from base region 126 and emitter region 127, respectively, under electrically isolated conditions from one another.

Electrical isolation layers 129-1 and 129-2 are disposed between emitter electrode 114 and base electrode 113 and between emitter electrode 114 and electrical isolation electrode 117 so as to attain electrical isolation.

Between electrothermal transducer 105 and transistor 110 there is provided a diffusion region 130 so as to prevent the heat generated at electrothermal transducer 105 from adversely affecting transistor 110, that is, so as to effect thermal isolation. The diffusion region 130 serves to elongate the life of the transistor 110 to a great extent.

Figure 2:
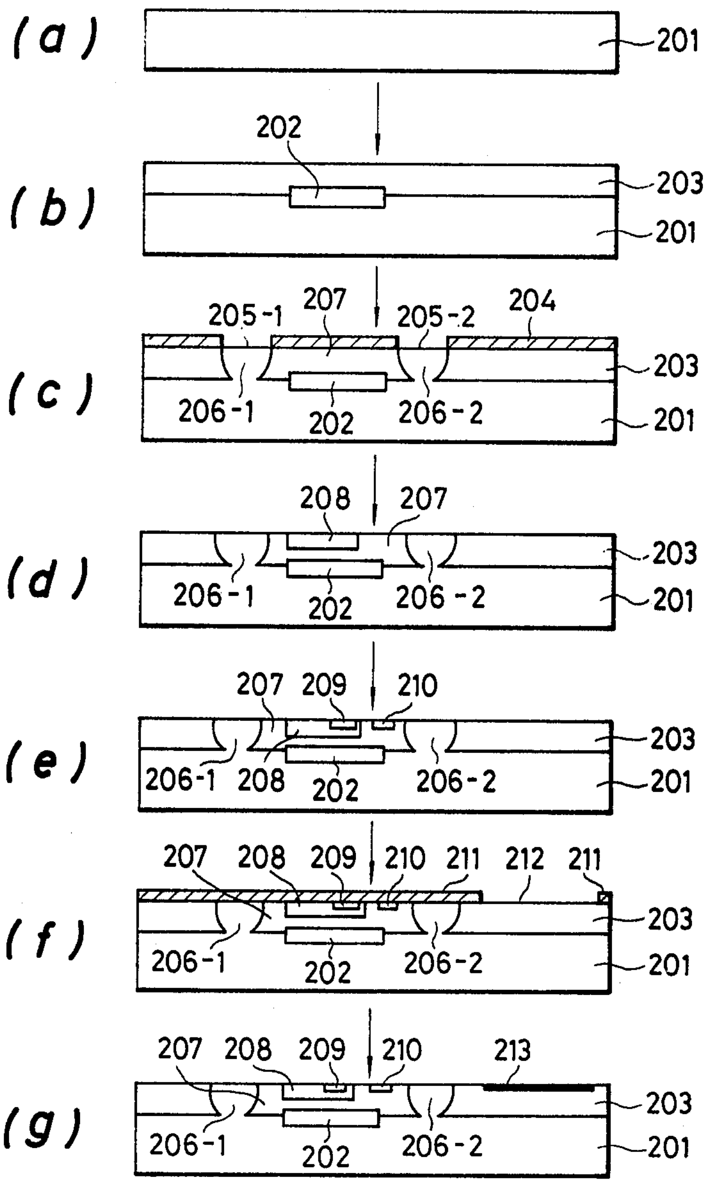
FIG. 2 shows schematically a process for fabricating the main portion of the device as shown in FIG. 1.

Now referring to FIG. 2, fabrication of element bearing member 101 is illustrated.

A p-type semiconductor substrate 201 is prepared (Step (a)), and an embedded layer 202 is formed in the substrate 201 so as to decrease the collector resistance, and an epitaxial layer 203 is produced thereon (Step (b)).

Embedded layer 202 is formed in a pattern form by diffusing antimony (Sb) or arsenic (As) through a window formed by applying a lithographic technique to an oxide film on the substrate 201.

After forming embedded layer 202, the oxide film is completely removed. An n-type epitaxial layer 203 is, then, grown on the substrate 201. The layer 203 is preferably about 10 μm thick.

On the surface of epitaxial layer 203, there is produced an oxide film 204. Windows 205-1 and 205-2 are formed in the oxide film by lithography. A p-type impurity is diffused through the windows 205 to produce diffusion regions 206-1 and 206-2 for isolation.

The portion surrounded by diffusion regions 206-1 and 206-2 is a collector region 207 of a bipolar transistor (Step (c)).

In Step (d), a base region 208 is formed by a diffusion method. Except the portion where the base region 208 is to be formed, the whole surface is coated with an oxide film and a p-type impurity such as boron (B) and the like is diffused at a high concentration to render $p^+$ resulting in formation of the base region 208.

In Step (e), an n-type impurity is diffused at a high concentration to produce $n^+$ regions and thereby an emitter region 209 and an ohmic region 210 which permits an ohmic contact between an aluminum electrode and the collector region 207. In this case, the emitter region 209 and the ohmic contact region 210 are simultaneously produced as $n^+$ semiconductor regions by the high concentration diffusion of the n-type impurity.

In Steps (f) and (g), there is formed a resistive heater region constituting an electrothermal transducer.

After completing Step (e), except the portion where a resistive heater region is formed, the whole surface is covered with a mask 211. Ion implantation is effected through a window 212 by using an ion implantation apparatus to produce a resistive heater region 213. The value of resistance may be optionally controlled by selecting appropriately the area of window 212, ion accelerating energy upon ion implantation and the kind of ion. The mask 211 should be thicker than the ion implantation distance of the ion.

Figure 1B:
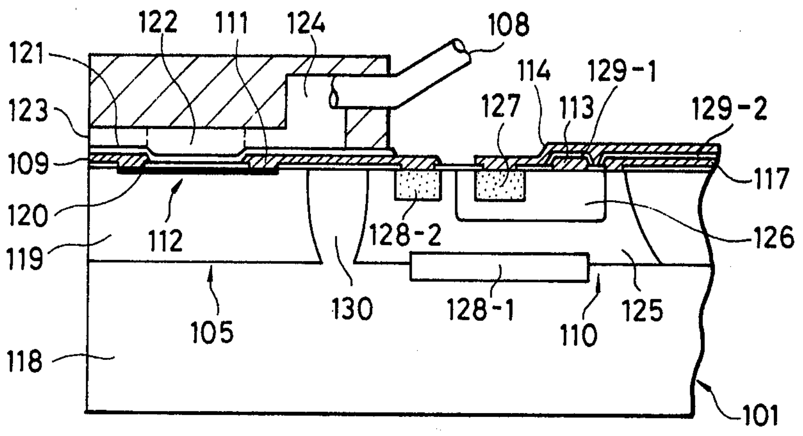

After forming the resistive heater region 213, the mask 211 is wholly removed. The resulting element bearing member having a monolithic hybrid integrated circuit is covered with a passivation film, and aluminum electrodes are formed at necessary positions. Thus the construction as illustrated in FIG. 1B is produced.

Where various ions were used for ion implantation to form the resistive heater region 213, the resulting characteristics are shown in the following. The following result shows that the best results were obtained by employing ions of elements of Group V of the Periodic Table, but when ions of elements of Group III of the Periodic Table were used, there were also obtained good results.

TABLE 1

| Impurity | Impurity source | Range (Flying distance) Å: 50 KeV acceleration | Range (Flying distance) Å: 100 KeV Heating | Evaluation |
|---|---|---|---|---|
| N | $N_2$ | 1400 | 3000 | B |
| P | $PH_3$, $PF_3$ | 600 | 1200 | Ⓐ |
| As | $AsH_3$, solid As | 300 | 600 | Ⓐ |
| Sb | solid Sb | 250 | 500 | Ⓐ |
| B | $B_2H_6$, $BF_3$ | 2000 | 4000 | A |
| Al | solid Al | 700 | 1500 | B |
| Ga | solid Ga | 300 | 600 | A |
| In | solid In | 250 | 450 | A |

Ⓐ: Excellent
A: Good
B: Practically usable

In Table 1, the "Range" is a projected range of an impurity, i.e., the depth from the surface of the resistive heater region 213.

Table 2 shows element characteristics depending upon the implanted ion amount (dose).

TABLE 2

| Dose | Concentration of impurity $cm^{-3}$ | Implantation time | Resistivity Ohm · cm | Evaluation |
|---|---|---|---|---|
| $10^{13}$ | $10^{17}$ | 1.2 sec. | $1 \times 10^{-1} - 3 \times 10^{-1}$ | B |
| $10^{14}$ | $10^{18}$ | 1.2 sec. | $2 \times 10^{-2} - 6 \times 10^{-2}$ | A |
| $10^{15}$ | $10^{19}$ | 2 min. | $5 \times 10^{-3} - 10 \times 10^{-3}$ | Ⓐ |
| $10^{16}$ | $10^{20}$ | 20 min. | $10^{-3}$ | Ⓐ |
| $10^{17}$ | $10^{21}$ | 3.3 hr. | $1 \times 10^{-4} - 3 \times 10^{-4}$ | Ⓐ |

Marks of "Evaluation" are the same as in Table 1.

An ion implantation apparatus used for obtaining the results shown in Table 1 and Table 2 was Ion Implantation Model 200-CF (manufactured by EXTRION Co.).

Various embodiments of the present invention are illustrated in FIG. 3–FIG. 7. In these Figures, there are shown only the portions which need explanations and the other portions are omitted.

Figure 3:
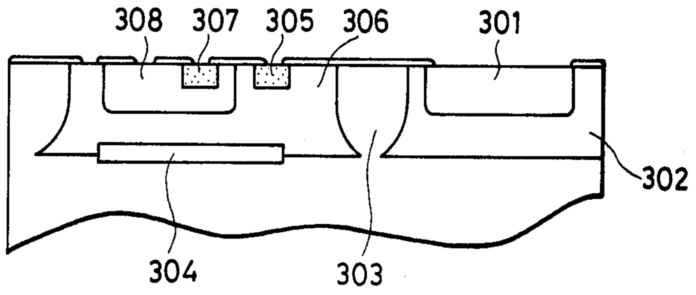
FIG. 3–FIG. 7 show schematically cross sectional views of main portions of other embodiments of the device according to the present invention.

Now referring to FIG. 3, a resistive heater region 301 is produced simultaneously with the production of a base region 308 by means of diffusion. In this case, one sheet of an exposure mask and three steps (an oxide film mask step, an ion implantation step, and a heat treatment step) can be advantageously omitted as compared with the case in FIG. 1. The other structure and configuration are the same as those in FIG. 1. That is, 302 denotes an epitaxial layer, 303 a diffusion region for thermal isolation, 304 an embedded layer for decreasing a collector resistance, 305 a ohmic contact region, 306 a collector region, 307 an emitter region and 308 a base region.

Figure 4:
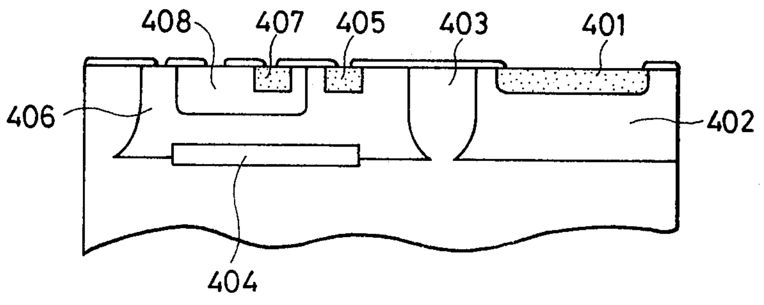

Referring to FIG. 4, a resistive heater region 401 is produced simultaneously with the production of an emitter region 407 by a diffusion method. The other procedures are the same as in FIG. 3.

Figure 5:
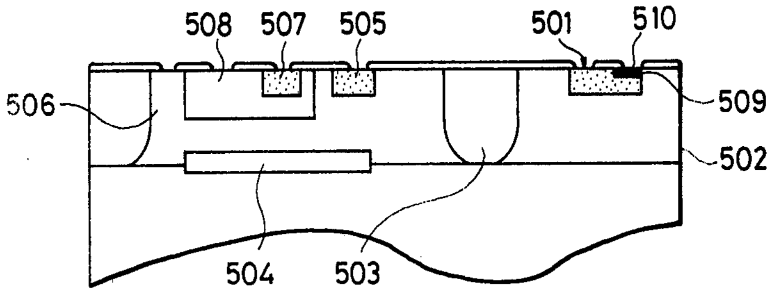

Referring to FIG. 5, a resistive heater region 501 is produced at a portion where the resistive heater region is to be formed, simultaneously with diffusion for forming an emitter or a base, and then diffusion of a p-type impurity is carried out at a part of said portion so as to form a p-type semiconductor region 510 resulting in formation of a p-n junction 509. In this embodiment, heat generation at the p-n junction 509 is utilized, and it is particularly preferable to utilize the heat generation at the p-n junction upon applying a forward bias and a reverse bias.

Figure 6:
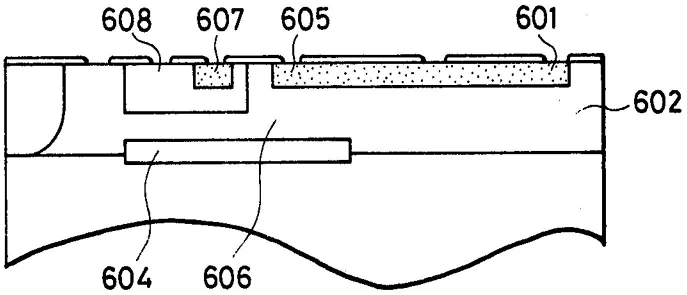

Referring to FIG. 6, the member is produced by further less fabrication steps. That is, in a bipolar transistor, a part of an ohmic contact region 605 and a part of a collector region 606 are extended to form a resistive heater region 601 at one end of the ohmic contact region 605, and therefore, the ohmic contact region 605 and the resistive heater region 601 are continued.

In this embodiment, as the collector resistance decreases, a voltage of collector and emitter $V_{CE}$ (SAT) decreases and the heat generation of the transistor itself can be suppressed to a great extent.

In FIGS. 4–6, 402, 502, and 602 denote an epitaxial layer; 403 and 503 a diffusion region for thermal isolation; 404, 504, and 604 an embedded layer; 405, 505 and 605 an ohmic contact region; 406, 506 and 606 a collector region; 407, 507 and 607 an emitter region; and 408, 508 and 608 a base region.

In the embodiments shown in FIG. 1–FIG. 6 there are illustrated npn bipolar transistors. However, in place of the npn bipolar transistors, there may be used other function elements having a switching function such as pnp bipolar transistors, MOS type transistors, SOS type transistors, lateral type transistors and the like.

Figure 7:
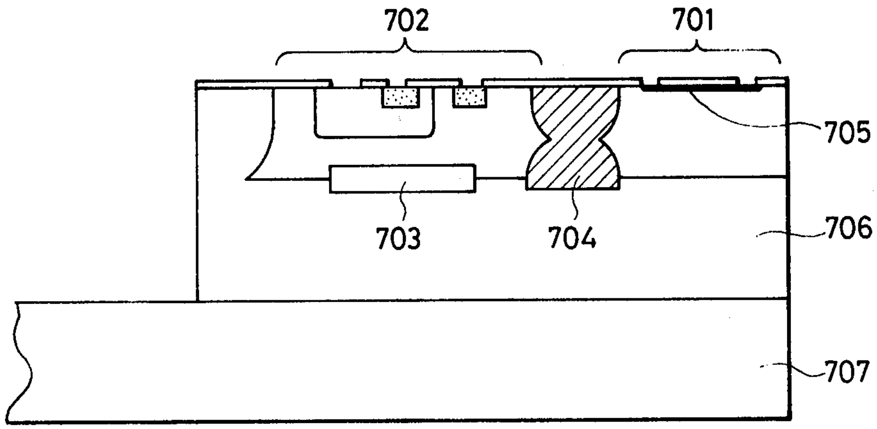

Referring to FIG. 7, the embodiment of the present invention has a structure capable of effectively intercepting an adverse effect of heat where the performance of function elements constituting the driving circuit is susceptible to heat. That is, a high impurity concentration region 704 is provided between an electrothermal transducer portion 701 and a function element portion 702 having a switching function. The region 704 extends from the same level as an embedded layer 703 to the surface of the member. The heat diffusing downward which is a part of the heat generated in a resistive heater region 705 transfers to a substrate 706 through the region 704 and then, is released externally through a heat sink 707 composed of, for example, aluminum plate. This structure serves to intercept almost completely the heat flowing from resistive heater region 705 to function element 702 along the surface of the semiconductor substrate 705.

Results of experiments for evaluating characteristics of the structure are as shown in Table 3.

TABLE 3

| | | Impurity ($cm^{-3}$) | Thermal conductivity (w/cm · °C.) |
|---|---|---|---|
| Si semiconductor substrate 706 | | $10^{10}$ | 1.6 |
| Region 701 | Sample 1 | $10^{18}$ | 12 |
| | Sample 2 | $10^{20}$ | 40 |
| | Sample 3 | $10^{22}$ | 60 |

With respect to Sample 2, the region 704 was of an impurity concentration of $10^{20}$ $cm^{-3}$. When the region 704 was not provided, the continuous use life of the npn bipolar transistor was 140 hours while the same transistor worked for 1000 hours or longer without any lowering of the performance under the same driving conditions as above.

When a p-type impurity is diffused into the high impurity concentration region, the region can possess both electrical isolation function and thermal isolation function.

The liquid jet recording device of the structure as illustrated in FIG. 1 was prepared and recording was effected under the conditions as shown in Table 4. Even when a long time, high speed recording was carried out with A-4 size paper to produce 10,000 sheets of copy, the resulting image quality was as high as that obtained at the beginning.

TABLE 4

| | | |
|---|---|---|
| Resistive heater | Length (Direction of flow path) | 100 μm |
| | Width | 40 μm |
| | Resistivity | $10^{-3}$ ohm · cm |
| | Impurity concentration | $10^{20}$ $cm^{-3}$ |
| | Kind of impurity (implanted) | p |
| Driving conditions for electrothermal transducer | Pulse width | 10 μsec. |
| | Pulse rising time | 0.1 μsec. or less |
| | Pulse falling time | 0.5 μsec. or less |
| | Electric current | 350 mA |
| Density of orifice | | 12 pieces/mm |
| Head length | | 210 mm |

Figure 8A:
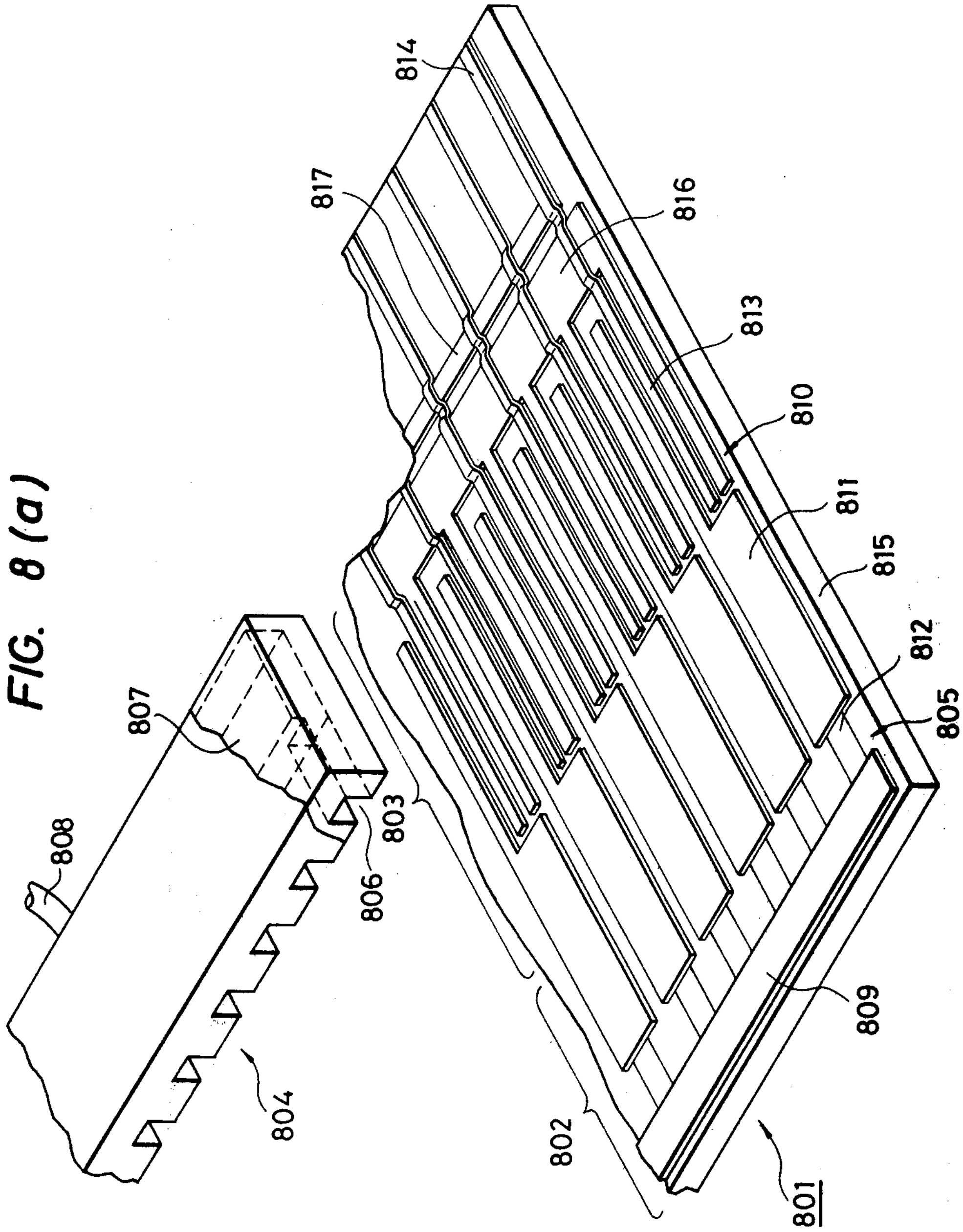
FIG. 8(*a*) shows schematically an oblique view of a preferable embodiment of the device according to the present invention.
Figure 8B:
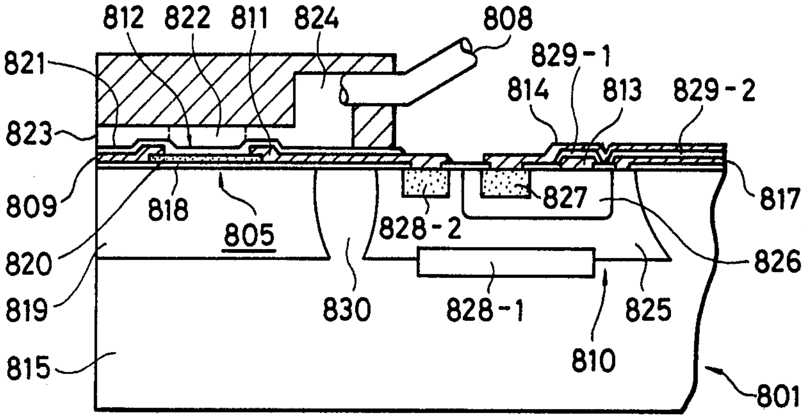

Now referring to FIG. 8(*a*), there is shown another embodiment of the present invention. The reference numerals in FIG. 8(*a*) correspond to those in FIG. 1(*a*) as shown below. The corresponding reference numerals show the same portions. 801 corresponds to 101, 802 to 102, 803 to 103, 804 to 104, 805 to 105, 806 to 106, 807 to 107, 808 to 108, 809 to 109, 810 to 110, 811 to 111, 812 to 112, 813 to 113, 814 to 114, 815 to 115, 816 to 116, and 817 to 117. It should be noted that the detailed structure of 812 is different from that of 112 as shown in FIG. 8(*b*).

Referring to FIG. 8(*b*), the reference numerals correspond to those in FIG. 1(*b*) as shown below. The corresponding reference numerals show the same portions.

801 corresponds to 101, 808 to 108, 809 to 109, 810 to 110, 811 to 111, 813 to 113, 814 to 114, 817 to 117, 819 to 119, 821 to 121, 822 to 122, 823 to 123, 824 to 124, 825 to 125, 826 to 126, 827 to 127, 828-1 to 128-1, 828-2 to 128-2, 829-1 to 129-1, 829-2 to 129-2, and 830 to 130.

On the surface of epitaxial layer 819 formed on a semiconductor substrate 815, there is provided an electrothermal transducer 805 in a form of a laminating structure. The electrothermal transucer 805 comprises a resistive heater portion 812 on a protective layer (heat accumulating layer) 818 formed on the surface of the epitaxial layer 819, a common electrode 809, and an electrode 811 for connecting to the collector region of a transistor 810. The resistive heater portion 812 is composed of a resistive heater 820 and a protective layer 821 to protect the resistive heater 820.

Figure 9:
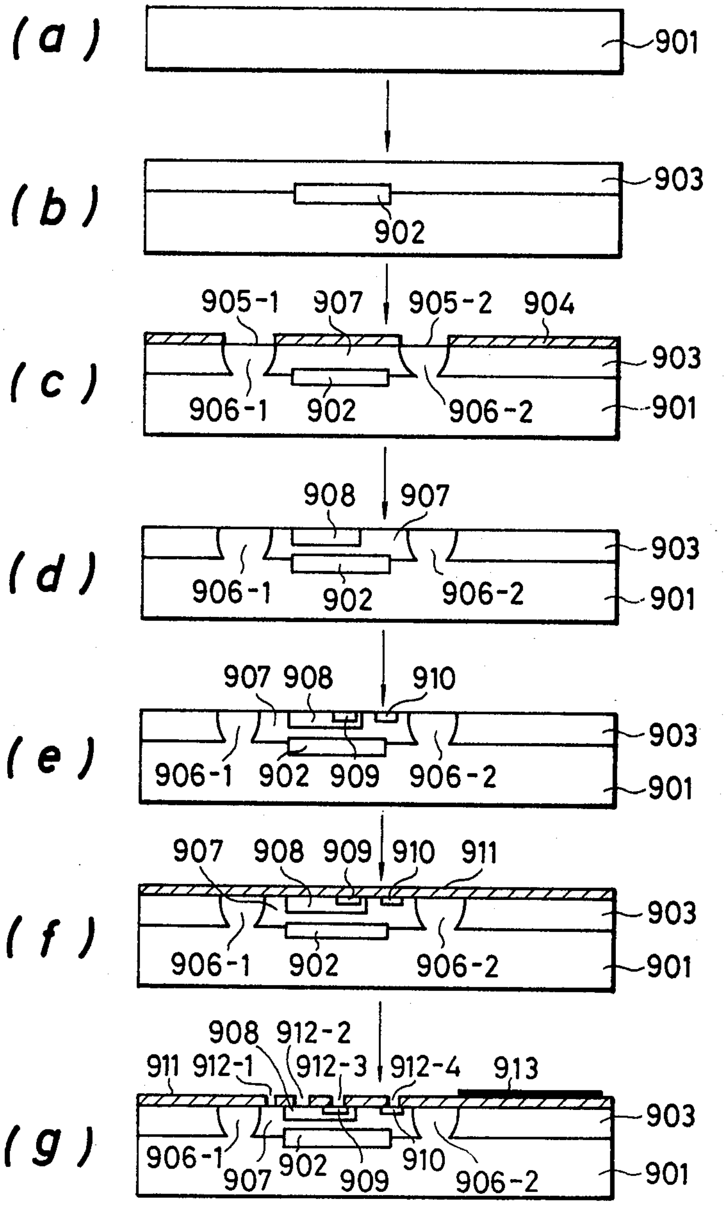
FIG. 9 shows schematically a process for fabricating the main portion of the device illustrated in FIG. 8.

Referring to FIG. 9, fabrication of element bearing member 801 is illustrated. The Steps (a)–(e) are the same as Steps (a)–(e) in FIG. 2, respectively. The correspondence between their reference numerals are: 901 to 201, 902 to 202, 903 to 203, 904 to 204 , 905-1 to 205-1, 905-2 to 205-2, 906-1 to 206-1, 906-2 to 206-2, 907 to 207, 908 to 208, 909 to 209, and 910 to 210.

After the completion of Step (e), an electrically insulating protective layer 911 is formed to protect the transistor portion. A resistive heater layer 913 is then formed on protective layer 911 by means of lithography, and at the same time, windows 912-1, 912-2, 912-3 and 912-4 are formed by dissolving the corresponding parts of the protective layer 911.

Preferable protective layers 911 are $SiO_2$ layers, $Si_3N_4$ layers and the like layers produced by sputtering or CVD, or oxide films produced by oxidizing the surface of the transistors.

The protective layer 911 under the resistive heater layer 913 may act as a heat accumulating layer for controlling diffusion of the generated heat in this embodiment.

Finally, an electrode material, such as aluminum and the like, is deposited by, for example, a vacuum deposition method, and patterning is carried out by photolithography resulting in completion of electrode wiring (this step is not shown in FIG. 9). Thus an element bearing member as shown in FIG. 8 is fabricated.

The resistive heater layer 913 may be produced by vacuum deposition such as vapor deposition, sputtering and the like, or CVD.

As a material constituting the resistive heater layer 913, there may be mentioned preferably a metal alloy such as NiCr and the like, carbides such as TiC and the like, borides such as $ZrB_2$, $HfB_2$ and the like, nitrides such as BN and the like, silicides such as $SIB_4$ and the like, phosphides such as GaP, InP and the like, and arsenides such as GaAs, $GaPxAs_{(1-x)}$ and the like.

Figure 10:
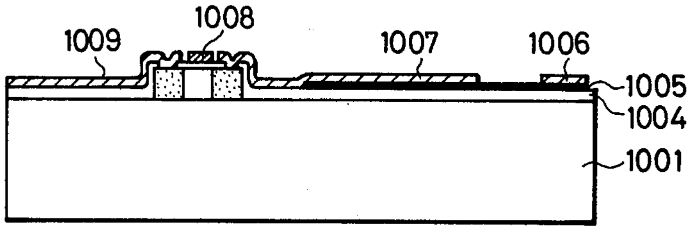
FIG. 10 shows schematically a cross sectional view of the main portion of a further embodiment of the device of the present invention.

FIG. 10 shows a main portion (element bearing member) of a further embodiment of the present invention.

Figure 11:
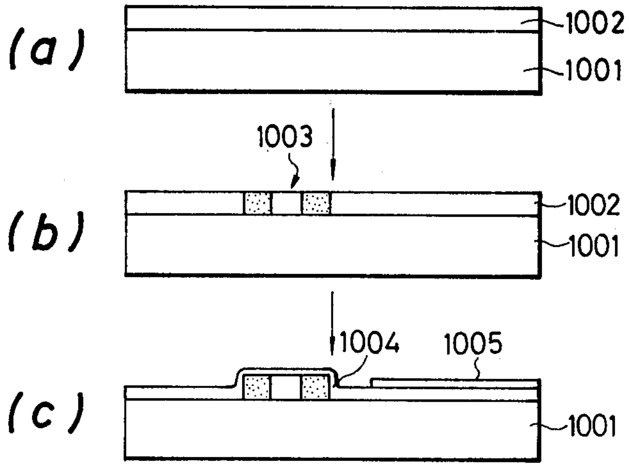
FIG. 11 shows schematically a process for fabricating the device according to the present invention.

FIG. 11 shows a part of fabrication steps of the embodiment in FIG. 10.

On an alumina ($Al_2O_3$) substrate 1001, there is formed an Si layer 1002 by epitaxial growing (Step (a) of FIG. 11). In the resulting Si layer, there is formed a PNP lateral transistor portion of SOS type 1003 by a conventional technique (Step (b) of FIG. 11).

A part of the surface of the Si layer except the transistor portion 1003 is removed by etching, that is, the Si layer is thinned and the remaining Si layer is oxidized to produce an $SiO_2$ protective layer 1004 (Step (c) of FIG. 11). On the $SiO_2$ protective layer there is formed a resistive heater layer 1005. Then, patterning and window-making of the protective layer on the transistor portion 1003 are effected simultaneously, and metal electrode portions such as aluminum and the like are laminated thereon followed by formation of electrodes 1006, 1007, 1008, and 1009 (FIG. 10) according to a lithographic technique.

The protective layer 1004 under the resistive heater layer 1005 can also function as a heat accumulating layer as in the previous embodiment. Further, when an NPN lateral transistor structure of SOS type is used in FIG. 10, the same result is obtained.

A liquid jet recording device as shown in FIG. 8 was prepared and recording was effected under the conditions as shown in Table 5 below.

Even after a long time, high speed recording with A-4 size paper to produce 10,000 sheets of copy, the resulting image quality was as high as that obtained at the beginning.

TABLE 5

| | | |
|---|---|---|
| Resistive heater | Length (Direction of flow path) | 200 μm |
| | Width | 40 μm |
| | Resistivity | $2 \times 10^{-4}$ ohm · cm |
| Driving conditions for electrothermal transducer | Pulse width | 10 μsec. |
| | Pulse rising time | 0.1 μsec. or less |
| | Pulse falling time | 0.5 μsec. or less |
| | Electric current | 300 mA |
| Density of orifice | | 12 pieces/mm |
| Head length | | 210 mm |

As mentioned above, according to the present invention, the liquid jet recording device can easily effect a high density, high speed recording with reliability and stability. In fabrication of said device, the yield is very high and the number of fabrication steps can be reduced resulting in low cost of fabrication. The structure of the device is suitable for mass production, and characteristics of the device, in particular, the heat releasing effect of the electrothermal transducer is increased to a great extent and thereby the duration life of signal separating elements such as diodes and transistors which are provided for the electrothermal transducer can be elongated to a great extent.

In the above explanations as to the present invention, recording heads having a plurality of liquid ejecting orifices, so-called multi-orifice type recording heads are mainly explained, but it should be noted that the present invention is applicable to so-called single-orifice type recording heads having one liquid ejecting orifice. However, the present invention is more effectively applied to multiorifice type, in particular, high density multi-orifice type recording heads.

What I claim is:

1. A liquid jet recording device, comprising:

means for defining a plurality of heat actuating chambers each communicating with an associate ejecting orifice for ejecting a liquid in the form of droplets;

a plurality of electrothermal transducers each provided for a separate one of said heat actuating chambers to transfer heat to the liquid filling the associated heat actuating chamber; and a driving circuit portion including a plurality of function elements for separating signals to drive independently each of said plurality of electrothermal transducers, and for driving said plurality of electrothermal transducers, said plurality of electrothermal transducers and said plurality of function elements being structurally formed in a surface of a substrate.

2. A liquid jet recording device according to claim 1 wherein said substrate is a semiconductor substrate.

3. A liquid jet recording device according to claim 1, wherein each of said plurality of function elements is a transistor.

4. A liquid jet recording device according to claim 1, further comprising a plurality of thermal isolation means each provided between one of said plurality of electrothermal transducers and one of said plurality of function elements.

5. A liquid jet recording device according to claim 1, wherein each of said plurality of electrothermal transducers includes a resistive heater, a pair of electrodes for applying electric current to the resistive heater, and a protective layer covering the resistive heater.

6. A liquid jet recording device, comprising:

means for defining a heat actuating chamber communicating with an ejecting orifice for ejecting a liquid in the form of droplets;

an electrothermal transducer provided for said heat actuating chamber to transfer heat to the liquid filling said heat actuating chamber; and a driving circuit including a function element for driving said electrothermal transducer, said electrothermal transducer and said function element being structurally formed in a surface of a substrate.

7. A liquid jet recording device, comprising:

means for defining a plurality of heat actuating chambers each communicating with an associate ejecting orifice for ejecting a liquid in the form of droplets;

a plurality of electrothermal transducers each provided for a separate one of said heat actuating chambers to transfer heat to the liquid filling the associated heat actuating chamber; and a driving circuit including a plurality of function elements for separating signals to drive independently each of said plurality of electrothermal transducers, and for driving said plurality of electrothermal transducers, said plurality of electrothermal transducers being mounted on the surface of a substrate in the surface of which said plurality of function elements are formed, said plurality of electrothermal transducers being mounted in a form of a laminating structure.

8. A liquid jet recording device according to claim 7 wherein said substrate is a semiconductor substrate.

9. A liquid jet recording device according to claim 7, wherein each of said plurality of function elements is a transistor.

10. A liquid jet recording device according to claim 7, further comprising a plurality of thermal isolation means each provided between one of said plurality of electrothermal transducers and one of said plurality of function elements.

11. A liquid jet recording device according to claim 7, wherein each of said plurality of electrothermal transducers includes a resistive heater, a pair of electrodes for applying electric current to the resistive heater, and a protective layer covering the resistive heater.

12. A liquid jet recording device, comprising:

means for defining a heat actuating chamber communicating with a ejecting orifice for ejecting a liquid in the form of droplets;

an electrothermal transducer provided for said heat actuating chamber to transfer heat to the liquid filling said heat actuating chamber; and a driving circuit including a function element for driving said electrothermal transducer, said electrothermal transducer being mounted on a surface of a substrate in the surface of which said function element is formed, said electrothermal transducer being mounted in a form of a laminating structure.

* * * * *

UNITED STATES PATENT AND TRADEMARK OFFICE

CERTIFICATE OF CORRECTION

PATENT NO. : 4,429,321

DATED : January 31, 1984

INVENTOR(S) : SHIGEYUKI MATSUMOTO

It is certified that error appears in the above-identified patent and that said Letters Patent is hereby corrected as shown below:

Column 1, line 22, change "Deutsch" to --Deutsches--.
Column 1, line 22, delete --No.--.

Column 2, line 16, change "good" to --high--.

Column 2, line 17, change "high" to --good--.

Column 2, line 44, after "and" insert --for--.

Column 2, line 45, delete --for--.

Column 3, line 30, delete --a--.

Column 3, line 38, delete --to--.

Column 8, line 30, change "transucer" to --transducer--.

Column 12, line 5, change "a" (first occurrence) to --an--.

Signed and Sealed this

*Seventh* Day of *August 1984*

[SEAL]

*Attest:*

GERALD J. MOSSINGHOFF

*Attesting Officer* *Commissioner of Patents and Trademarks*